(12) United States Patent
Berger et al.

(10) Patent No.: US 7,221,452 B2
(45) Date of Patent: May 22, 2007

(54) TUNABLE OPTICAL FILTER, OPTICAL APPARATUS FOR USE THEREWITH AND METHOD UTILIZING SAME

(75) Inventors: Jill D. Berger, Los Gatos, CA (US); Douglas W. Anthon, El Cerrito, CA (US); Fedor A. Ilkov, Sunnyvale, CA (US); David A. King, Menlo Park, CA (US)

(73) Assignee: Coherent, Inc., Santa Clara, CA (US)

( * ) Notice: Subject to any disclaimer, the term of this patent is extended or adjusted under 35 U.S.C. 154(b) by 456 days.

(21) Appl. No.: 10/638,061

(22) Filed: Aug. 7, 2003

(65) Prior Publication Data

US 2004/0125374 A1 Jul. 1, 2004

Related U.S. Application Data

(60) Provisional application No. 60/435,816, filed on Dec. 19, 2002, provisional application No. 60/402,127, filed on Aug. 7, 2002.

(51) Int. Cl.
*G01J 3/28* (2006.01)
(52) U.S. Cl. .................... 356/327; 356/328; 356/334
(58) Field of Classification Search ........ 356/326–334, 356/364–369; 385/37, 18, 31; 372/99, 102
See application file for complete search history.

(56) References Cited

U.S. PATENT DOCUMENTS

| | | | |
|---|---|---|---|
| 5,054,871 A | 10/1991 | Deri et al. | |
| 5,164,786 A * | 11/1992 | Delhaye et al. | 356/326 |
| 5,886,785 A | 3/1999 | Lefevre et al. | |
| 5,946,128 A | 8/1999 | Paek | |
| 6,141,361 A | 10/2000 | Mears et al. | |
| 6,177,992 B1 * | 1/2001 | Braun et al. | 356/327 |
| 6,329,737 B1 | 12/2001 | Jerman et al. | |
| 6,400,509 B1 | 6/2002 | Sappey et al. | |
| 6,469,415 B2 | 10/2002 | Jerman et al. | |
| 6,583,873 B1 * | 6/2003 | Goncharov et al. | 356/326 |
| 6,636,306 B2 * | 10/2003 | He et al. | 356/327 |
| 6,646,740 B2 * | 11/2003 | Braun et al. | 356/334 |
| 6,687,001 B2 * | 2/2004 | Iwama | 356/328 |

(Continued)

OTHER PUBLICATIONS

Dan Sadot and Effraim Bolmovich, "Tunable Optical Filters for Dense WDM Networks", IEEE Communications Magazine, Dec. 1998, pp. 50-55.

(Continued)

*Primary Examiner*—Layla G. Lauchman
(74) *Attorney, Agent, or Firm*—Dorsey & Whitney LLP

(57) ABSTRACT

An apparatus for filtering an input beam of light to produce an output beam of light is provided. The apparatus facilitates tuning an input beam of light to a desired wavelength by directing the input beam of light, via a mirror, onto a diffractive optical element and returning the diffracted portion of the input beam of light as an output beam of light. The apparatus may also include a polarization recovery element adapted for receiving the input beam of light and outputting a first and second spatially offset beam of polarized light. The apparatus may also be configured as a tunable receiver by utilizing a detector to detect a characteristic of a filtered output beam. The output beam may be additionally filtered by a spatial filter.

46 Claims, 8 Drawing Sheets

U.S. PATENT DOCUMENTS

| | | |
|---|---|---|
| 6,791,685 B2 * | 9/2004 | Youn et al. .................. 356/327 |
| 6,891,676 B2 * | 5/2005 | Ford et al. ................... 359/572 |
| 6,930,776 B2 * | 8/2005 | He et al. ..................... 356/328 |
| 6,999,169 B2 * | 2/2006 | Sanpei et al. ................ 356/328 |
| 2001/0021299 A1 | 9/2001 | Hamamoto |
| 2001/0031107 A1 * | 10/2001 | Bradshaw .................... 385/10 |
| 2001/0036206 A1 | 11/2001 | Jerman et al. |
| 2002/0164125 A1 | 11/2002 | Berger et al. |
| 2003/0026302 A1 | 2/2003 | Anthon et al. |
| 2003/0094881 A1 | 5/2003 | Grade et al. |

OTHER PUBLICATIONS

D.D. Caplan and W.A. Alter, "A Quantum-limited, Optically-matched Communication Link", Proceeding of the Optical Fiber Communication Conference, OSA Technical Digest Series, Optical Society of Amercia, paper MM2-1.

\* cited by examiner

TUNABLE OPTICAL FILTER, OPTICAL APPARATUS FOR USE THEREWITH AND METHOD UTILIZING SAME

CROSS REFERENCE TO RELATED APPLICATIONS

The present application claims priority to U.S. provisional patent application Ser. No. 60/402,127 filed Aug. 7, 2002 and U.S. provisional patent application Ser. No. 60/435,816, filed Dec. 19, 2002, the entire contents of each of which are incorporated herein by this reference.

INVENTIVE FIELD

The various embodiments of the present invention generally relate to the field of widely tunable optical bandpass filters and particularly to those utilized in dense wavelength division multiplexing or dense wavelength division multiplexing optical networks.

BACKGROUND

Tunable optical bandpass filters offer significant advantages in dense wavelength division multiplexing or DWDM optical networks. Single channel tunable bandpass filters are used for amplified spontaneous emission suppression after optical amplification, and in receivers as adaptive pre-filters for noise reduction. When used for noise reduction, a fiber-in, fiber-out filter followed by a separate fiber-coupled receiver may be used, or the filter and detector may be integrated into a single tunable receiver unit. Universal line cards based on tunable receivers may reduce the costs of maintaining inventory and spares. Tunable filters may also reduce costs for optical performance monitoring by allowing one monitor to select between multiple channels. More generally, tunable filters can be used in reconfigurable optical add-drop multiplexers (ROADM) which are often the central switching element of a transparent optical node.

Commercially available tunable filter technologies include, but are not limited to, fiber Bragg gratings, arrayed waveguide gratings, linearly variable thin film dielectric filters, Mach-Zehender interferometers, fiber Fabry-Perot etalons, Fabry-Perot etalons with deformable semiconductor multi-layer mirrors, and certain devices combining two or more or these elements. See, for example, "Tunable Optical Filters for Dense WDM Networks," by Dan Sadot and Effraim Bolmovich, *IEEE Communications Magazine*, December 1998, pp. 50–55. These and other filter technologies have certain drawbacks that limit or reduce their desirability. For example, some of these devices suffer from slow tuning speed, large form factor, large power consumption, narrow tuning range, large insertion loss, repeating passbands, and/or poor adjacent channel isolation. Additionally, in some such devices the filter bandpass shape cannot be easily modified to range from a broad flat-top to a narrow Gaussian. The optimum filter for a given application may require tailoring the bandpass shape or it may depend on the ease with which a receiver can be integrated into the device. See, for example, "A quantum-limited, optically-matched communication link, D. D. Caplan and W. A. Alter, paper MM2-1, Proceedings of the Optical Fiber Communication Conference, OSA Technical Digest Series, Optical Society of America, Washington, D.C., 2001. Further, in certain of such devices the center wavelength may be adjusted by a voltage-controlled position with no internal wavelength reference, and may require complex temperature mapping. In addition, for some of such devices it may be difficult, if not impossible, to construct as a combined filter and receiver.

Fixed diffraction gratings typically have not been used in telecommunications-grade tunable filter applications. Tunable filters incorporating fixed diffraction gratings are commonly multi-element devices that utilize electronically-driven deflection elements in combination with fixed gratings to generate a narrow and tunable transmission function. See, for example, U.S. Pat. Nos. 5,946,128 and 6,141,361. Rotating diffraction gratings, mounted in one of several well-known scanning monochrometer configurations, may be used for spectrum analysis but, generally, are not suitable for telecom-grade tunable filter applications due to their mechanical complexity and size.

As such, there is a need for a diffractive tunable filter that does not include many of the foregoing disadvantages and which desirably provides superior optical transmission and tuning characteristics.

SUMMARY

One embodiment of the present invention provides a tunable optical device for use with an input beam of light comprising a polarization recovery element adapted for receiving the input beam of light and outputting first and second spatially offset beams of polarized light. The invention also comprises a dispersive optical element and a movable mirror for directing the first and second beams of polarized light onto the dispersive optical element and receiving a portion of the first and second beams of polarized light returned from the dispersive optical element.

In another embodiment of the present invention a tunable optical device for use with a beam of light comprises a dispersive optical element and a movable mirror adapted for directing the beam of light onto the dispersive optical element, receiving a portion of the beam of light returned by the dispersive optical element.

Another embodiment of the present invention provides an optical apparatus for use with a collimated input beam of light. The optical apparatus comprises a polarization recovery element adapted for receiving the arbitrarily polarized input beam of light and outputting first and second collimated beams of polarized light with the same polarization state. A mirror directs the first and second beams of light to the diffractive optical element. The diffractive optical element receives the first and second beams of light and produces first and second returned beams of light of a same polarization state, and directs the first and second returned beams of light to the polarization recovery element. An actuator is coupled to and provides for rotating the mirror. The polarization recovery element receives the first and second returned beams of light and outputs a single output beam of light.

Another embodiment of the present invention provides an optical apparatus for use with an arbitrarily polarized input beam of light comprising a polarizing beam splitter adapter for receiving and splitting the arbitrarily polarized input beam into first and second beams of polarized light, and a Faraday rotator. The apparatus further comprises a reflector for directing the first beam of polarized light to the Faraday rotator. A path length compensator is disposed between the beam splitter and the Faraday rotator and delays the travel of the second beam of light to the Faraday rotator. The Faraday rotator aligns the polarization of the first and second beams of polarized light. The apparatus also includes first and second half-wave plates for respectively receiving the first and second aligned beams of polarized light.

Other embodiments, devices, elements, components and the like may also be utilized in conjunction with and/or separate of the before mentioned and following embodiments of the present invention as described in greater detail below.

BRIEF DESCRIPTION OF THE DRAWINGS

The following drawings, which are somewhat schematic and are incorporated in and form a part of this specification, illustrate various embodiments of the present invention and, together with the detailed description, serve to explain the principles of the present invention.

DETAILED DESCRIPTION

In general, a diffractive tunable filter operable over a wide frequency range for use in a dense wavelength division multiplexing optical network is provided. As is described in greater detail below, for at least one embodiment, single mode optical fibers may be used as the input and output of the diffractive tunable filter such that the wavelength dependence of the transmission spectrum may be Gaussian and well-suited for applications including pre-receiver channel selection, amplified spontaneous emission (ASE) suppression, and optical performance monitoring. In other embodiments of the present invention, a non-Gaussian spectrum, such as a flat top spectrum, may be obtained by using a slit or spatial filter of fixed or variable width as the output aperture. Such an exit slit is well suited to a tunable receiver, where low-loss integration of the slit with the receiver photodiode is possible.

The various embodiments of the present invention may utilize a polarization recovery element that is compatible with physically identical or separate input and output ports. The polarization recovery element is generally positioned after a collimating optical element to minimize the insertion and polarization dependent losses.

Tunable optical filters can be utilized in a variety of applications, especially in applications where it is desirable to selectively tune a received signal to a plurality of selected frequencies. Such applications include, but are not limited to, light wave and other communication systems, optical sensing systems, and other systems which utilize optical signaling for the transmission of information, control signals, and/or other data. The present invention provides various embodiments of optically tunable filters which are herein described without regards as to the specific application(s), system(s) or process(es) in which such embodiments may be utilized.

Figure 1:
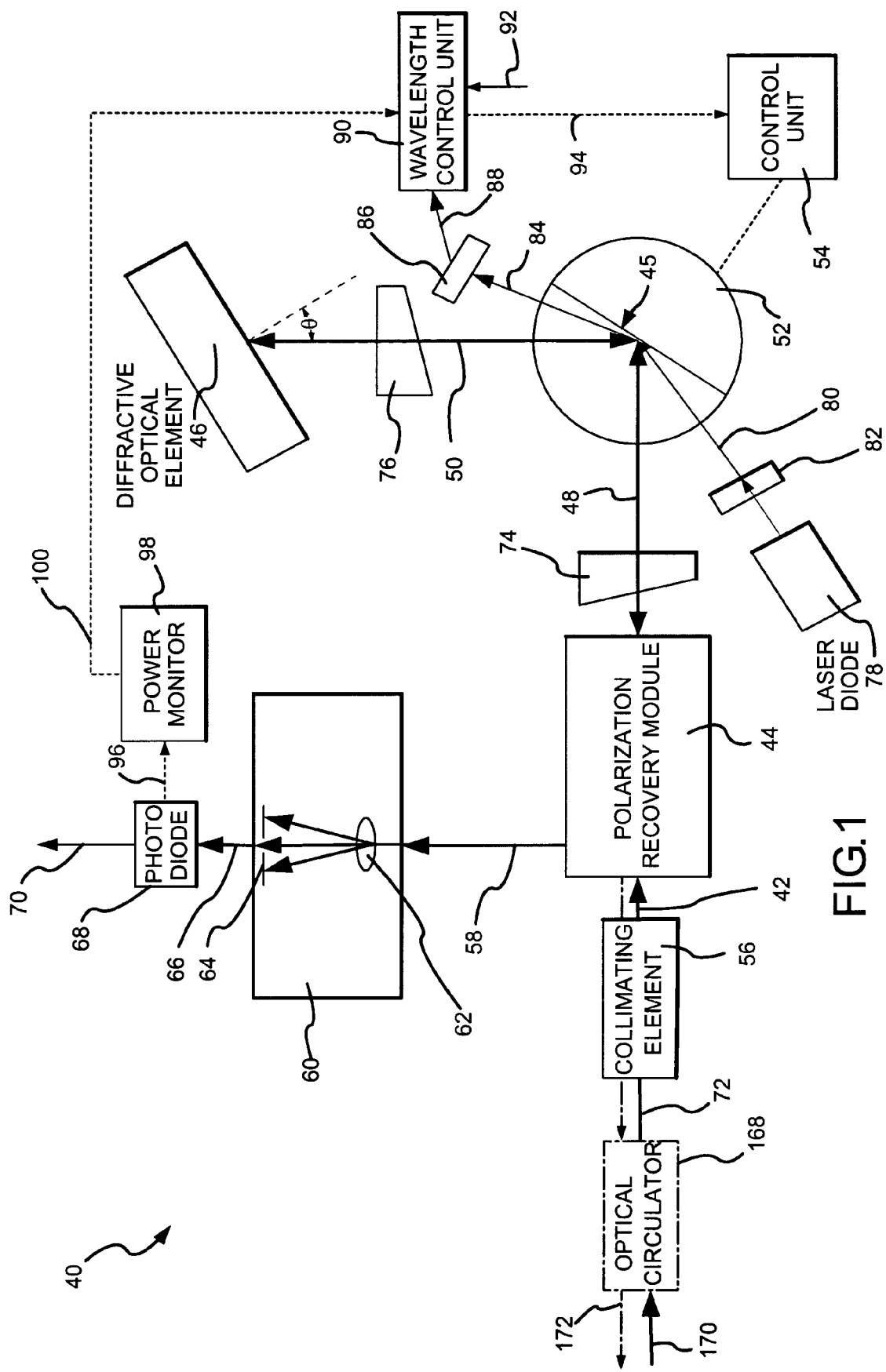
FIG. 1 is a block diagram illustrating various devices and components which may be utilized in various embodiments of a diffractive tunable filter of the present invention.

An overview of the various components and/or devices utilized in a diffractive tunable filter 40 which can be configured to filter a beam of light over a range of frequencies is illustrated in FIG. 1. As shown therein, a diffractive tunable filter or filter 40 generally includes, an input path 42, a polarization recovery element 44, which is suitably connected to the input path 42, a reflective optical element or mirror 45, and a diffractive, dispersive, or reflective optical element 46 (hereinafter, a "diffractive optical element"). The mirror 45 is preferably movable and is desirably positioned relative to a diffractive optical element 46 such that upon receiving a first beam of light, for example via the input path 48, the mirror 45 directs the first beam along a second path 50 and towards the diffractive optical element 46. The first beam is diffracted, dispersed, filtered and/or otherwise returned by the diffractive optical element 46 and a portion of such first beam, hereafter the "returned beam" or "diffracted beam," is propogated back along the second path 50 towards the mirror 45. The returned beam angle depends upon the light frequency. The portion of the returned beam with frequencies in the filter passband is directed back along the second beam path 50 and the first beam path 48. More specifically, the mirror 45 is positioned relative to the diffractive optical element 46 such that the first beam is returned, by the diffractive optical element 46 at a predetermined angle based upon the frequency of the light, the angle of incidence of the first beam, upon reflection from a reflective surface on the mirror 45, to the normal of the diffractive surface on the diffractive optical element 46. In FIG. 1, this angle of incidence is identified by the symbol "θ".

The position of the diffractive optical element 46 can be fixed or movable relative to the axis of rotation for the mirror 45. The diffractive optical element or grating 46 can be any suitable diffractive element such as a diffractive grating mounted in a Littrow configuration in which the returned output beam, counter propagates along the same path, that is the second path 50, of the input beam. At the diffractive surface of the diffractive optical element 46, the angles between the surface normal, and the input beam ($\theta_i$) and diffracted/filtered beam ($\theta_d$) ideally satisfy the grating equation:

$$m\lambda = d(\sin \theta_i + \sin \theta_d).$$

where λ is the wavelength and d is the pitch of the diffraction grating. When operated at the first order Littrow angle, m=1 and $\theta_i = \theta_d = \theta$, and the return beam angle θ as a function of wavelength can then be expressed as the Littrow condition, λ=2d sin θ. The Littrow mount maximizes the grating efficiency for a given grating groove density and wavelength. The nominal wavelength of the returned beam is determined by the wavelength that satisfies the Littrow condition. Note that in embodiments using separate input and output apertures, the input spatial filter (the fiber) and the output spatial filter (fiber or aperture) are not identical, and cases where $\theta_i - \theta_d$ is small, but not zero, are also possible. In these cases the actual filter wavelength may be determined from the grating equation and may differ slightly from the nominal value. The filter 40 also includes an actuator 52 to which the mirror 45 is coupled and preferably mounted to facilitate the directing of the first beam along the second path 50 towards the grating 46 such that light of a predetermined wavelength is returned by the grating 46. The actuator 52 rotates the mirror 45 in order to diffract the first beam onto the second path 50, so that the propogated light beams are incident upon the grating 46 at such an angle that the incident light is predominately diffracted by the grating 46, back into the second path 50 and towards the mirror 45 at the predetermined and desired wavelength. In general, the actuator 52 changes the angle at which the light propogated over the second path 50 is incident upon the grating 46 and advantageously changes the angle θ between the incident light and the normal to the surface of the diffractive optical element 46. Light diffracted back along the input beam paths 50 and 48 is coupled to an output aperture that selects a narrow band of frequencies.

Although filter 40 can be operated over any suitable wavelength range, filter 40 preferably operates across the C-band from 1527 nm to 1567 nm, using a 1200 groove per millimeter (gr/mm) grating which is mounted relative to the mirror to achieve a Littrow-diffraction angle of 68° at a center wavelength of 1547 nm. It is to be appreciated, however, that other diffraction angles, tuning ranges and/or center wavelengths may be utilized. Such other tuning ranges may be obtained by changing the diffraction angle θ and/or the spacing "d" of the grooves in the grating 46. For example, operation across the L-band from 1566 nm to 1607 nm may be accomplished at a Littrow-diffraction angle of 68° if a grating with 1170 gr/mm is used. For the embodiment shown in FIG. 1, the center-pivoted mirror surface 45 is mounted at 45° and the output wavelength may be tuned from 1527 nm to 1567 nm by rotating the mirror 45 through +/−1 degrees.

Although any suitable actuator 52 can be utilized, tunable filter 40 preferably utilizes a microactuator, and more preferably a micro-electromechanical or MEMS actuator. A MEMS actuator is generally preferred because of its small size, millisecond response time and low control power requirements. MEMS actuators are typically produced using semiconductor fabrication techniques that offer the additional advantage of low-cost volume production. Ideally, the combined mass of the mirror 45 and actuator 52 are approximately balanced in three dimensions so as to improve the stability of the assembly to vibration. Particularly, suitable actuator 52 designs are electrostatic actuators, such as of the type described in U.S. Pat. Nos. 6,329,737 and 6,469,415 the entire contents of which are hereby incorporated by this reference. Other microactuators may also be utilized, as is practical depending upon filter constraints and specific features and functions of any given embodiment, to rotate and/or translate the mirror 45 and/or the grating 46.

The filter 40 preferably includes a control unit 54 which provides control signals to the actuator 52. In short, the rotation of the mirror 45 and the operation of the actuator 52 occur under the control of the control unit 54. Although any suitable control unit can be utilized, the unit 54 can be similar to the type described in U.S. Publication Nos. US-2002-0164125-A1 and US-2003-0026302-A1, the entire contents of which are incorporated herein by this reference.

Fixed, rotatable and/or translatable mirrors 45 in combination with fixed, rotatable and/or translatable gratings 46 and/or other components may be used to tune the diffractive filter 40 to a given wavelength. Although such rotation/translation may occur with respect to any combination of axes that maintains the in-plane alignment of the device, the rotation is typically about an axis parallel to the direction of the grating grooves. In general, any combination of fixed or movable mirrors 45, gratings 46 and other components may be utilized to tune the filter 40 to a given wavelength. Further, while less desirable generally for purposes of efficiency, second order, third order and other order radiation reflected by the grating 46 may be utilized to tune the filter 40 to a predetermined wavelength.

The filter may also include a collimating optical element 56 which collimates converging and/or diverging input light beams into parallel or collimated beams on the input path 42. The filter 40 also includes an output beam path 58 onto which the returned output beam is propogated or output from the polarization recovery element 44. Further, the output beam path 58, for this preferred embodiment, is connected to a spatial filter assembly 60, which includes a focusing lens 62 and a slit 64. The output of the spatial filter assembly 60 is provided on a spatially filtered beam path 66 to a photodetector 68, which suitably characterizes the received light provided via the spatially filtered path 68 and generates electrical signals indicative thereof. Each of the components and/or connectors are discussed in further detail below. In an opposite direction of propagation along return beam path 42, the collimating optical element focuses a plurality of parallel beams of light onto a focal point, for example, for coupling into the optical fiber 72.

Referring again to FIG. 1, the filter 40 also includes a connector to an input fiber 72, such connector currently being provided to the collimating optical element 56. The collimating optical element 56 may be utilized with any suitable collimating lens. However, the tunable filter 40 preferably utilizes a 1.96 mm focal length lens as the collimating optical element. The range of frequencies over which an input fiber 72 may communicate light is determined by a combination of the fiber mode size, the dispersion of the grating 46 and the focal length of the collimating optical element 56. In a typical embodiment, an SMF28 single mode fiber is used as the input fiber 72, however, other suitable optical fibers may also be utilized.

As described above, the filter 40 includes a polarization recovery module or element 44. In general, the polarization recovery element 44 receives an input beam of light, via the input path 42, conditions the input beam of light, and outputs a first beam of light onto the first path 48. Additionally, in the opposite transmission direction, the polarization recovery element 44 receives a returned beam of light, via the first path 48, conditions such returned beam and provides an output beam of light on the output beam paths 42 or 58. The output beam of light is utilized in accordance with the specific implementation of the filter in an optical network or system or otherwise. Various embodiments of polarization recovery elements are discussed herein.

Figure 2:
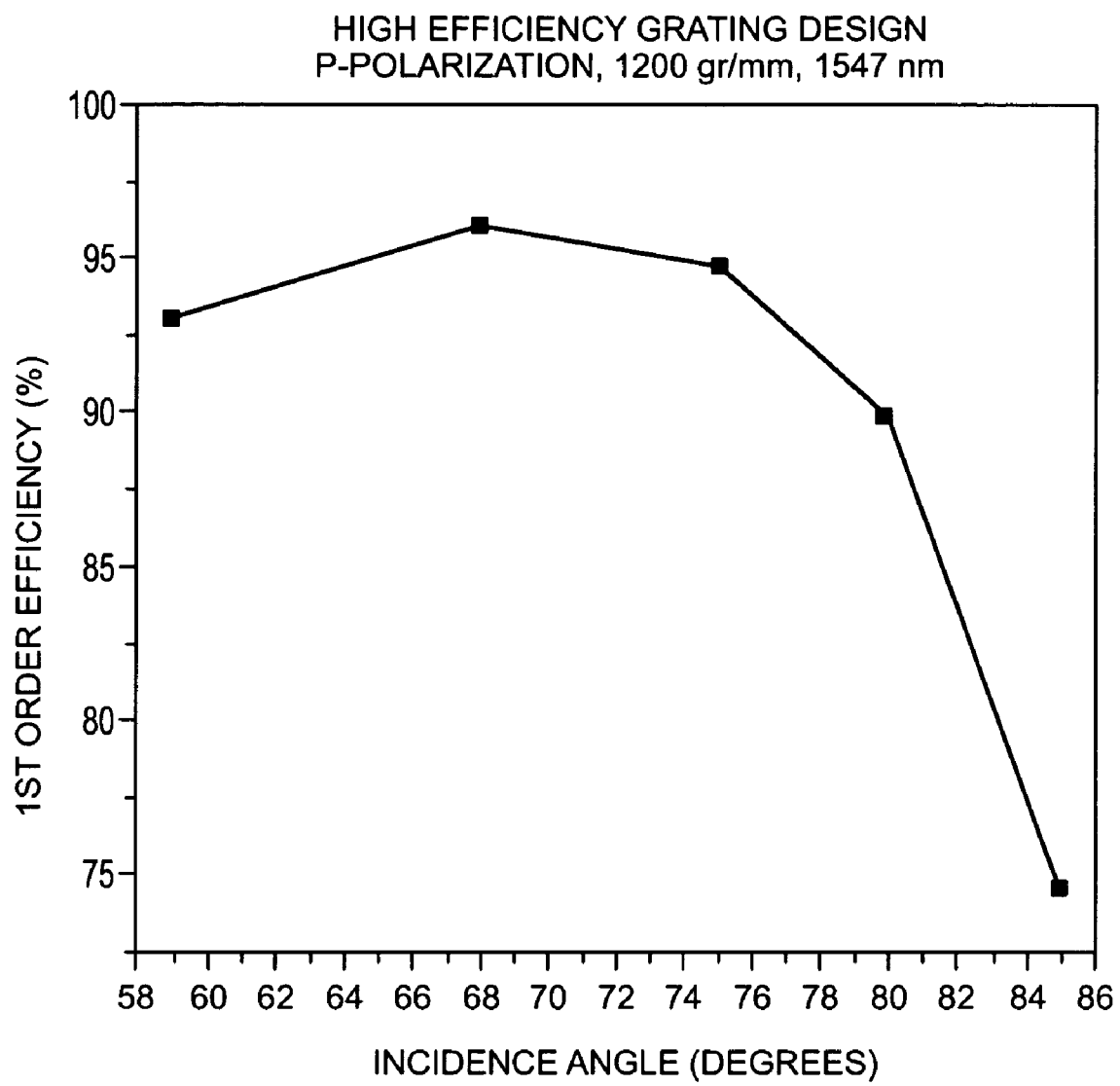
FIG. 2 is a graph illustrating the first order diffraction efficiency of the tunable optical filter of FIG. 1.

In general, the polarization recovery element 44 is utilized to convert a received input beam of light into a first beam, and then provide the input beam to the tuning assembly comprising diffractive optical element 46 and the mirror 45. More specifically, the polarization recovery element 44 splits the input beam of light into two parallel p-polarized first beams which propagate via the first path to the mirror 45. In general, the polarization recovery element 44 is utilized to minimize insertion losses and polarization losses. As is commonly appreciated, for many applications, stringent requirements for insertion loss and polarization dependent loss may exist. Typical telecom dense wavelength division multiplexing applications often require tunable filters to have an insertion loss of less than 2.0 dB and a polarization dependent loss of less than 0.2 dB. Commonly, the insertion loss depends upon the grating efficiency and round-trip fiber coupling efficiency, while the polarization dependent loss depends upon the polarization dependence of the grating efficiency. FIG. 2 shows the calculated first order diffraction efficiency at 1547 nm and p-polarization versus incidence angle for a commercially available 1200 gr/mm diffraction grating. As shown, a maximum efficiency of 96% is achieved for p-polarization at the Littrow angle of 68°. The diffraction efficiency decreases with increasing angle to 90% at 80° and 75% at 85°.

As described above, the polarization recovery element 44 desirably p-polarizes the arbitrarily polarized input light beams such that the incident light, that is the first beam, upon the grating 46, is diffracted with the 96% grating efficiency shown at the Littrow angle in FIG. 2. It is to be appreciated that for the direction parallel to the grating grooves, that is for s-polarization, the efficiency is much lower. In another embodiment of filter 40 which does not include a polarization recovery element 44, a grating 46 with low polarization dependent loss can be utilized. Gratings of conventional design can offer diffraction efficiencies for s and p polarizations that are similar at or near the Littrow angle, but generally have absolute diffraction efficiencies that are smaller than gratings designed for p-polarization. Alternatively, non-conventional grating designs that combine high diffraction efficiency with low polarization dependent loss, for example, echelle gratings, may advantageously be used. U.S. Pat. No. 6,400,509 B1, the entire contents of which are incorporated herein by reference, describes a non-conventional low polarization dependent loss grating design that may be suitable for certain embodiments of the present invention. However, in general, while grating design changes may be utilized to minimize both insertion loss and polarization dependent loss, various embodiments of the present invention reduce insertion loss and polarization dependent loss by illuminating the grating 46 with p-polarization only. Various polarization recovery element embodiments suitable for illuminating the grating 46 with p-polarization only are discussed in greater detail below with reference to FIGS. 6 and 7.

In addition to polarizing the light incident upon the grating 46, it is often desirable to increase the width of the beam of light incident upon the grating. It is commonly appreciated that for grating-based devices that the number of illuminated lines on the grating 46 determines the wavelength resolution of the device. A larger beam width decreases the achievable spectral bandwidth. The number of illuminated lines on a grating 46 is proportional to the secant of the angle θ between the incident beam and the grating surface normal. In order to illuminate more lines on the grating 46, the tunable filter 40 includes at least one beam width adjuster and preferably first and second beam width adjusters or beam expanders 74 and 76. A first beam expander 74 can be positioned between the polarization recovery element 44 and the mirror 45. The first beam expander 74 receives the first beam, via the first path 48, and expands the diameter of the first beam so that as the beam is reflected by the mirror 45 into the second path 50 and onto the grating 46, so that more of the grooves in the grating 46 are illuminated. Alternatively and/or additionally, a second beam expander 76 may be positioned in the filter 40, for example along the second path 50 and between the mirror 45 and the grating 46, in order to further expand the first beam and thereby illuminate more grooves on the grating 46. Either or both beam expanders 74 and 76 may be used to expand the first beam such that more of the grooves in the grating 46 are illuminated and the filter spectral bandwidth is decreased.

Desirably, the beam expanders 74 and 76 expand the beam in a single direction perpendicular to the diffraction grating rulings, and perpendicular to the mirror rotation axis, by using suitable optical devices such as anamorphic prisms or cylindrical telescopes. The beam expanders 74 and 76 are preferably compatible with and may be used with other embodiments of the filter 40, and desirably are independent of the polarization recovery element 44 embodiment, if any, employed.

When using beam expanders 74 and 76, the grating incidence angle θ may be configured such that it is near the optimum angle of 68° suggested by the chart of FIG. 2. The beam size may then be independently adjusted to provide the desired resolution. Adjustments to the beam size may be accomplished, for example, by changing the relative angles of the beam expanders 74 and 76 on the first and second paths 48 and 50, or using other well known optical techniques When the input fiber 72 is a single input/output fiber, as is discussed in greater detail below, the spectral bandwidth of the tunable filter 40 is directly related to the resolution of the diffractive optical element 46. As such, the bandwidth of the tunable filter 40 may be changed by varying the number of illuminated lines on the diffraction grating 46. In other embodiments, such as a tunable receiver which generates at least one electrical signal based upon information signals contained within an optical signal, the width of the slit filter 64 or other spatial filtering device commonly determines the spectral bandwidth and the bandpass shape will be determined by the combined resolution of the tunable filter 40 and the adjustable spatial filter 60. The resolution of the tunable filter 40 can be adjusted by changing, that is expanding, the beam diameter in the direction perpendicular to the grating grooves. As such, it is to be appreciated that beam expanders 74 and 76 may also be utilized to further condition the input beam for tuning by the tunable filter 40.

Additionally, it is to be appreciated that when a pair of beam expanders are utilized, the magnitude of the change in resolution with filter wavelength can be minimized. This variation is caused by mirror-angle dependent changes in the input beam diameter at the grating surface. In particular, if $\Delta_g$ is equal to the change in grating incidence angle, defined as the angle between the grating normal and the input beam, required to tune the filter between wavelengths $\lambda_o$ and $\lambda$, the beam radius at the grating 46 is equal to:

$$w_G = w_p / \cos(\theta_o + \Delta_g)$$

where $w_G$ is the radius of the input beam as it intersects the grating 46, $w_p$ is the radius of the beam as it leaves the first beam expander 74, and $\theta_o$ is the incident angle corresponding to the wavelength $\lambda_o$. The radius at the grating 46, therefore, increases with increasing angle at the grating 46. The beam expansion provided by the second beam expander 76 is also a function of the angle between the incident beam and the normal to the input facet of the second beam expander 76 according to the following equation:

$$w_p = w_o / \cos(B_{o+\Delta m})$$

where $w_o$ is the radius of the beam at the input surface of the second beam expander 76, $B_o$ is the angle between the input beam and the first surface normal when the filter 40 is tuned to $\lambda_o$ and $\Delta_m$ is the change in mirror rotation angle required to tune the filter 40 between $\lambda_o$ and $\lambda$. If the grating 46 and the second beam expander 76 are oriented such that an increase in incidence angle at the grating 46 corresponds to a decrease in incidence angle at the prism, the change in magnification may be adjusted to correct for the change in beam size at the grating 46. Therefore, it is to be appreciated that by utilizing beam expanders 74 and 76 the filter 40 may be configured to provide for greater beam size uniformity over the tuning range at the grating 46 and thereby provide for greater filter bandwidth uniformity over the tuning range.

The diffractive tunable filter 40 may also be utilized to further condition and filter light beams, as desired, by combining the tuning assembly, that is the grating 46 and mirror 45, with other optical, electrical, mechanical and/or other components, including but not limited to those discussed herein. For example, the tuning assembly may be configured to include after the polarization recovery element 44, such as along output beam path 58, a spatial filter assembly 60, such as one having an adjustable width slit.

The filter assembly 60 can include a slit 64, a spatial filter or other type of filter. The slit 64 may include a pinhole or slit in a suitable membrane such as a metal plate. The membrane is desirably located at the focal distance for a given wavelength of a focusing lens 62 or other suitable collimating optical element, which suitably collimates the light provided on the output beam path 58, that is the returned output beam. Using this configuration, unwanted radiation is blocked by the slit 64 and is not output by the filter 40. Further, additional tuning and/or conditioning of the returned output beam may be accomplished by providing an adjustable or moveable spatial filter 60. The spatial filter 60 may be configured closer to or farther away from the focusing lens 62 and thereby the filter 40 adjusted to any given bandwidth.

When the mirror 45 is positioned so that a desired wavelength is diffracted by the grating 46, the angle between the input beam and the grating surface normal is desirably θ and the filter 40 provides a returned beam whose position is centered on the focusing lens 62 and the slit 64. Ideally, the waist of the focused beam is coincident with the plane of the slit 64.

Additionally, as the wavelength of the diffracted beam is changed Δλ, the center frequency of the light provided on the output beam path 58 to the focusing lens 62 and the slit 64 will vary by a distance $$\Delta x = \frac{Mf\Delta\lambda}{d\cos\theta},$$

wherein M is the magnification of the beam expanders 74 and 76, f is the focal length of the focusing lens 62, d is the period of the grating 46, and θ is the angle which satisfies the Littrow condition. $\lambda=2d\sin\theta$ The radius of the output beam at the slit 64 is approximately $w=fw_1/f_1$, where $w_1$ is the ($1/e^2$) beam radius of the Gaussian input light provided on the input filter 72, $f_1$ is the focal length of the collimating optical element 56.

For purposes of comparison, if the slit 64 is not utilized and the focal length of the collimating optical element 56 and the focusing lens 62 are the same, it is to be appreciated that $w=w_1$. In this case, the insertion loss of the tunable optical filter 40 may be calculated as:

$IL(dB)=-10\log[\exp(-(\Delta x/w)^2)]$ which provides the following Gaussian bandpasses:

$3dB$(full width) bandwidth=$1.66wd\cos\theta/(Mf)$; and $20dB$ bandwidth=$4.29wd\cos\theta/(Mf)$.

As noted above, these results are proportional to the width of the first beam at the surface of the grating 46 in the direction perpendicular to the grooves. This result applies to the tunable filter 40 when the collimating optical element 56 and the focusing lens element 62 have equivalent focal lengths. Further, for this embodiment, the magnification required for a particular bandwidth can be calculated using typical component values of 1.94 mm for the focal length of a 0.23 pitch, SLW 1.8 SELFOC lens and 5.2 µm for the mode field radius for SMF28 fiber, and assuming the 68° Littrow angle for a 1200 line-per-mm grating. To obtain a 250 pm (32 GHz) 3 dB bandwidth and a 650 pm (82 GHz) 20 dB bandwidth, for example, a magnification of 5.55 is utilized.

In certain applications it may be desirable to have a non-Gaussian spectrum or to change the bandwidth of the filter 40 in response to changing spectra of the light on the input fiber 72. This may be accomplished by using an adjustable slit. For example, by using any suitable micro-actuator or other motor, the slit jaws may be linearly translated. Additionally, and/or alternatively, spatial filters with spatially varying amplitude transmittance functions may also be placed at the focal point of the focusing lens 62, or at other locations in the optical path, in order to shape the pass band of the light provided on the output beam path 58. Additionally, and/or alternatively, spatial filters with spatially varying amplitude transmittance functions may also be placed at the focus of the focusing lens 62, or at other locations in the optical path, in order to shape the pass band of the light output by slit 64 and for example, provided to the photodetector 68.

Further, the spectrum at the photodetector 68 is generally determined by the transmission function of the slit 64, which is determined by the relative size of the slit and the input beam. For a Gaussian beam with radius w, the transmission through a slit of full width s is given by $$\text{InsertionLoss(dB)} = -10\log\left[\frac{1}{2}\left[\text{erf}\left(\frac{s+2\Delta x}{w\sqrt{2}}\right) + \text{erf}\left(\frac{s-2\Delta x}{w\sqrt{2}}\right)\right]\right].$$

Figure 3:
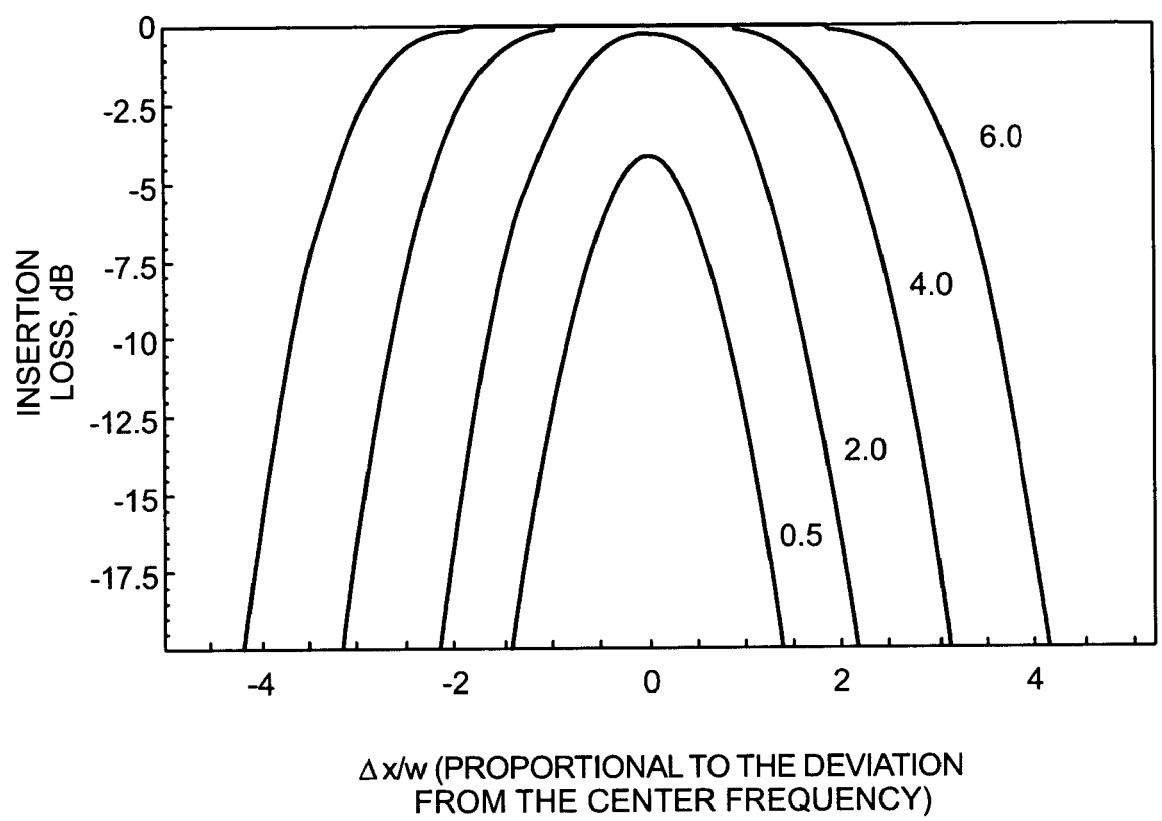
FIG. 3 is a graph showing the shapes of the filter bandpasses that can be achieved by varying the width of a slit used as a spatial filter in conjunction with a lens in the tunable optical filter of FIG. 1.

The results of the preceding insertion loss minimization approach are shown in FIG. 3. More specifically, FIG. 3 provides the relationship between the Insertion Loss (in decibels) versus the effect of a change in the shifting of a beam of light of w width upon a slit filter when a Gaussian beam is transmitted through a rectangular slit. Further, the above function evolves from a lossy Gaussian for s<<w to a flat top with Gaussian edges for s>> w. In particular, when s=2w, that is when the slit width equals the mode field diameter, the response is very similar to that of a filter coupled to a fiber with a mode field radius equal to w. It is to be appreciated, that flat top spectra obtained this way are useful when the resolution of the system is higher than required for the channel spacing. For example, if a filter with a 20 dB spectral width of 82 GHz is used in a system with 100 GHz channel spacing that requires a 170 GHz 20 dB bandwidth, the slit width can be chosen to give an 88 GHz flat section at the center of the bandpass.

The insertion loss minimization approach previously described above with respect to FIG. 3 is more difficult with a tunable filter having a slit that is coupled to a fiber instead of to a photodetector, where the spectrum additionally depends on the spatial overlap of the signal transmitted by the slit with the mode of the output fiber. If the slit is significantly wider than the fiber mode field diameter, for example, then most of the power transmitted by the slit will not couple to the fiber. This can be avoided by using a slit 64 that is narrower than the mode field diameter of an output fiber (not shown, however, it is to be appreciated that in the embodiment shown in FIG. 1, such output fiber would replace, and or be possible on conjunction with, the photodetector 68). Further, a mode field diameter at the slit 64 should be narrower than the slit. However, it is to be appreciated that such a configuration generally introduces loss because of the increased beam divergence. For example, when the mode field diameter at the slit 64 is one third that of the mode of an output fiber, the loss will be approximately 5 dB. This loss may be mitigated, for example, by using a cylindrical focus in the focusing lens 62 so that the mode field diameter at the slit remains large along the long axis of the slit.

It is to be appreciated, that the distinction between a tunable filter and a tunable receiver is somewhat artificial. When a multimode fiber is used in lieu of a photodetector 68, the difficulty of fiber coupling is greatly relaxed and the results ascribed to a tunable receiver can be obtained in a fiber-coupled form. Similarly, if a waveguide photodiode is used in a tunable receiver embodiment, the coupling problem is very similar to that of a single mode fiber such that the device will have similar properties to those ascribed to the tunable filter. Suitable waveguide detectors may include multi- or single mode semiconductor waveguides with photo-detection capabilities. Examples of suitable waveguide detectors are described in U.S. Pat. No. 5,054,871 and in U.S. patent application Publication No. 2001/0021299 A1, the entire contents of each are incorporated herein by this reference.

In order to provide tighter center frequency control, the tunable filter 40 may include an optical wavelength stabilization system. Several such systems include position detection apparatus that does not require information from an input signal. For example, the tunable filter 40 may stabilize filter operation by sensing the capacitance seen by the mirror voltage input, for example by means of a closed loop servo control system of the type described in U.S. Publication No. US-2001-0036206, the entire contents of which are incorporated herein by this reference. With a typical electrostatic microactuator, capacitance sensing has a typical resolution limit of 1 part in 400. This corresponds to 12.5 GHz in a filter that is designed to tune across 100 channels that are 50 GHz in spacing.

A position detector apparatus of the present invention may also be provided which utilizes optical reference beams reflected from mirror 45 to monitor the position of the mirror 45. Such an optical apparatus, which can be used in conjunction with or as an alternative to the capacitance sensing system referred to above, preferably includes a second reference source 78 which directs a second reference beam 80 at the mirror 45. The output from the reference source 78, such as a laser source and preferably a laser diode or light emitting diode, is preferably collimated by a collimating optical element 82 and directed towards the rotatable mirror 45. The reflected reference beam 84 is incident on a position sensitive detector 86. As the mirror 45 rotates, the reflected reference beam 84 is translated across the surface of the position sensitive detector 86. The position sensitive detector 86 outputs a determination of the mirror position 88 to a wavelength control unit 90. The wavelength control unit 90 compares the mirror position to a set point 92 and generates an output signal 94, for example an error signal, to the control unit 54. The position of the mirror 44 is adjusted by means of actuator 52 based upon control signals generated by the control unit 54 according to the error signal 94. The position sensitive detector 86, wavelength control unit 90, control unit 54 and actuator 52 are typically operated as a closed loop servo system that stabilizes the mirror position 88 to the set point value 92 and stabilizes the center frequency of the filter.

It may also be desirable to coarsely position the mirror 45 using techniques such as of the type described and/or referred to above and, when a signal is present, lock the mirror 45 position to the mirror position 88 of the target input channel by maximizing the output power. The tunable filter 40 may be configured to accomplish such tuning by including an output power control apparatus. One embodiment of such a control apparatus may utilize the photodetector 68. As described above, the photodetector 68 receives a filtered beam, via the filtered path 66, from the spatial filter assembly 60. The photodetector 68 desirably provides a second electrical signal 96 to a power monitor 98. In the embodiment shown in FIG. 1, the power monitor 98 is configured to monitor the DC bias current as supplied by the photodetector 68. It is to be appreciated, however, that other devices and/or methods may be utilized to monitor the output power of the filter 40. Further, the power detector 98 or the photodetector 68, depending upon embodiment utilized, outputs a power signal 100 to the wavelength control unit 90. Using the power signal 100 and/or any of the above mentioned mirror position signals, the wavelength control unit 90 generates a tuning error signal when a signal is not present or the filter 40 is being tuned to a new target channel. Advantageously, a locking error signal is generated when the filter 40 is tuned to a channel with an active signal. Such error signals are suitably provided to the control unit 54 to desirably control the position of mirror 45.

In various other embodiments, an improved locking signal may also be generated by modulating the mirror angle at an audio frequency. The resulting amplitude variation on the output beam path 66 may be detected using a phase sensitive detector (not shown), thereby providing a more accurate lock point and reducing the sensitivity of the locking circuit to power variations in the input beam.

Thus, it is to be appreciated that the positioning of the mirror 45 may be controlled using various techniques and processes, some of which have been described herein. Other known techniques and processes for controlling a mirror or other optical components may also be utilized in conjunction with various embodiments of the diffractive tunable filter of the present invention.

In many dense wavelength division multiplexing applications it is desirable for the filter 40 to function adequately in the presence of mechanical shock and vibration. Shock and vibration applied to the actuator 52 may lead to deviation, both in the plane of the actuator and out of the plane of the actuator, of the returned beam, with concomitant degradation of optical performance. In the tunable filter 40, measurement and correction systems and servo control electronics and algorithms may be utilized to correct for shock and vibration over certain ranges of frequency and applied force. See, for example, U.S. Pat. No. 6,469,415 and U.S. Publication No. US-2003-0094881, the entire content of which is incorporated herein by this reference. In plane deviation of the output beam of filter 40 often leads to a deviation in the center frequency 88 of the filter 40, which as discussed above, may be measured using the position sensitive detector 86 and corrected for using the wavelength control unit 90. However, out-of-plane deviations of the optical beam may require additional measurement and servo systems.

The tunable filter 40 may include a two dimensional position sensitive detector which is capable of measuring out-of-plane deviations. Such a two dimensional position sensitive detector generates signals for both out-of-plane deviations of the filter beam as well as providing signals utilized for center frequency control. A correction system for out-of-plane deviation of the filter beam may use a low numerical aperture or NA lens mounted on a linear actuator such as a linear electrostatic or other MEMS microactuator. Examples of suitable lens actuator assemblies are disclosed in U.S. Publication No. US-2001-0036206 and U.S. patent application Ser. No. 10/099,414, the entire contents of each are incorporated herein by reference. Further, it is to be appreciated that the correction subsystem may be placed at any point along the first path 48, the second path 50, and/or the output beam path 67. Additionally, an electronic control unit may be used in certain embodiments to servo and control those lenses, if any, utilized to stabilize the filter. Devices and processes for controlling any such lenses are known in the art.

Figure 4:
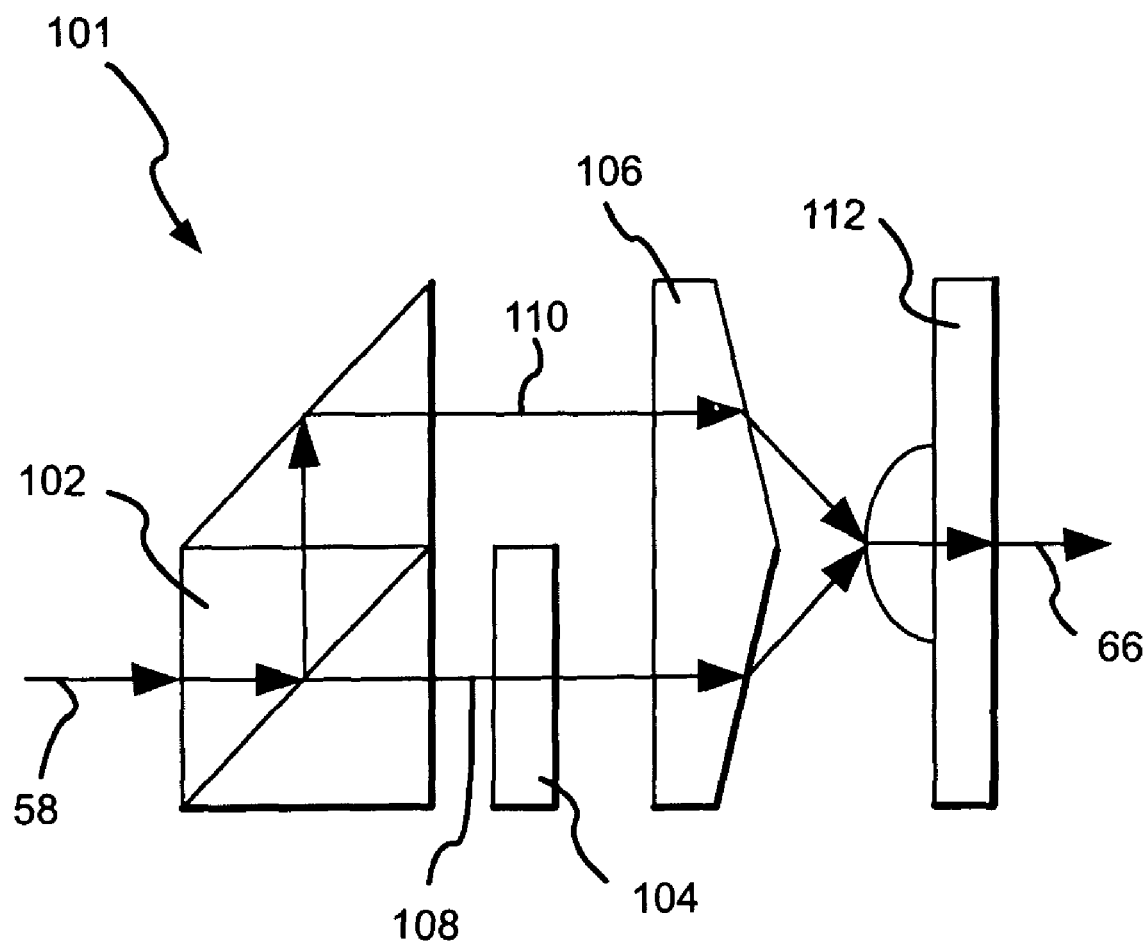
FIG. 4 is a block diagram of a combination of optical elements that produces two adjacent focused spots on the spatial filter.

Referring now to FIG. 4, an alternative embodiment of a filter assembly 101 which may be utilized to generate a flat top spectral response is shown. In this embodiment, a beam splitter 102, pathlength compensator 104 and a steering element 100 are utilized to split the light on output beam path 58 into first and second beam components 108 and 110, prior to passing such beams through the focusing lens 112 and onto the second filtered path 66. In particular, the light on output beam path 58 is passed through a beam splitter 102 which splits the lights into a first output beam component 108 and a second output beam component 110. Desirably, the light on the output beam path 58 is split in the plane which is perpendicular to axis of rotation for the mirror 45 (as shown in FIG. 1). Further, the first and second output beam components 108 and 110 are equalized in path length prior to focusing such components onto the focusing lens 112. In one embodiment, such path length equalization is accomplished using a pathlength compensator 104 which "slows down" the transmission of the first output beam component 108 to the steering element 106 and thereby compensates for the shorter path length through the beam splitter 110 for the first output beam component 108 with respect to the second output beam component 110. Each of these output components 108 and 110 are then directed by the steering element 106 onto the focusing lens 112 so that the two beams 108 and 110 are focused by the lens 112 onto the second filtered path 66 as two Gaussian signals of 3 dB width w, which are separated by a distance d, wherein the distance d corresponds to a frequency shift of $\Delta f$.

Figure 5:
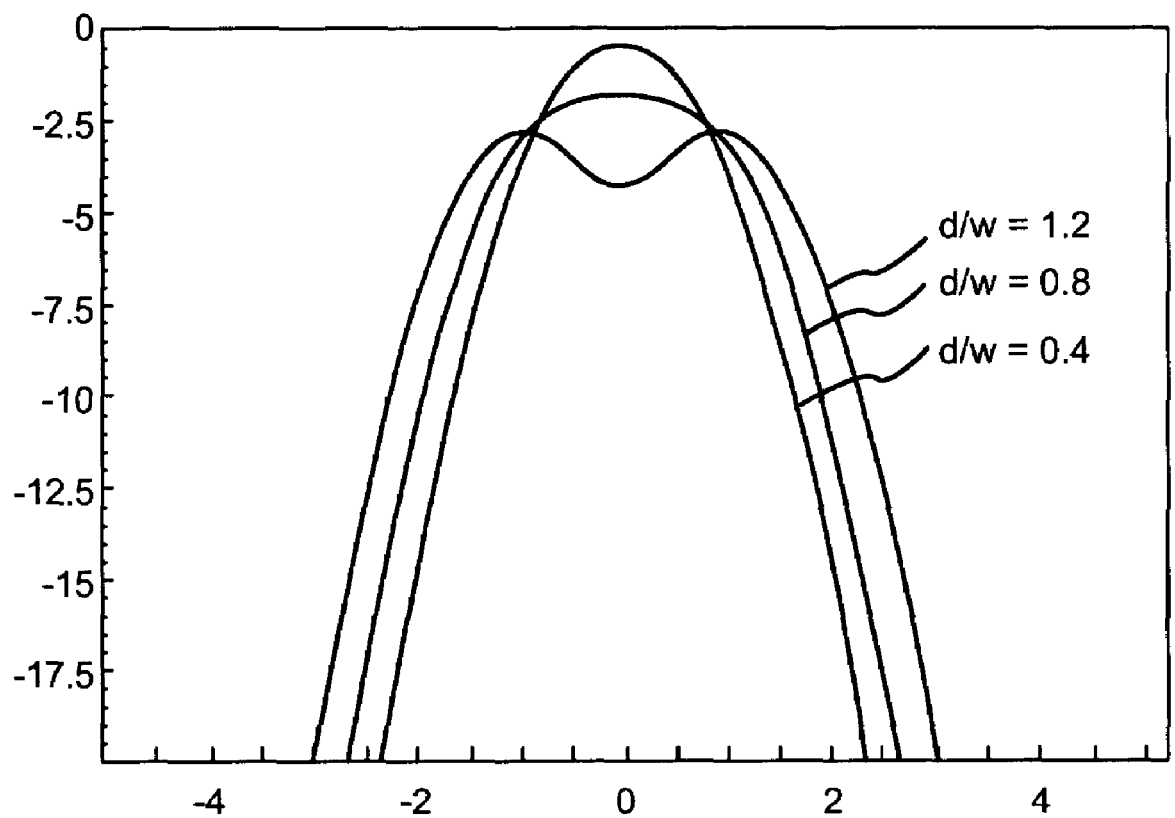
FIG. 5 is a graph showing the relationship between the insertion loss and the deviation from the center frequency for a spectral profile generated using the filter of FIG. 4.

Advantageously, by splitting the light on the output beam path 58, using the beam splitter embodiment shown in FIG. 5, instead of a single Gaussian signal with a peak centered at f0 with a 3 dB width of $\delta f$ two superimposed beams are generated, which when summed together result in a nearly flat top peak with a 3 dB width of approximately $\delta f + \Delta f$. As shown in FIG. 5, the shape of the resulting peak is determined by the ratio d/w, with small values giving a near-Gaussian peak and large values resulting in a bimodal spectrum.

Further, for the embodiment shown in FIG. 5, optimum flatness is obtained for d/w near 0.8. However, interference effects between the first and second beam components 108 and 110 may result in significant disturbances of the resulting output beam such as ripples in the pass band. As such, appropriate path length compensation may be important in minimizing ripple and/or other effects.

It is to be appreciated that analogous techniques may be employed with more than two beams to produce a broader spectral profile. For example, many other embodiments may be utilized to provide the beam splitter 102, the path length compensator 104, and/or the steering element 106, for example interferomatic devices may be particularly suitable. Further, such devices may be suitably combined in certain embodiments and/or may not be necessary, depending upon specific design details. As such, it is to be appreciated that generation of a flat top spectral profile (or a substantially flat top spectral profile) based upon an output beam generated by a diffractive tunable filter may be accomplished using various devices and configurations thereof.

As discussed above, the tunable filter 40 also may include a polarization recovery element 44 (as shown in FIG. 1). In general, the polarization recovery element 44 conditions those light beams received on the input path 42 so that low insertion loss and low polarization dependent loss may be accomplished. The polarization recovery element 44 may be utilized in conjunction with collinearly propagating input and output beams. Such a configuration may be referred to as a "common path" polarization recovery element.

Figure 6:
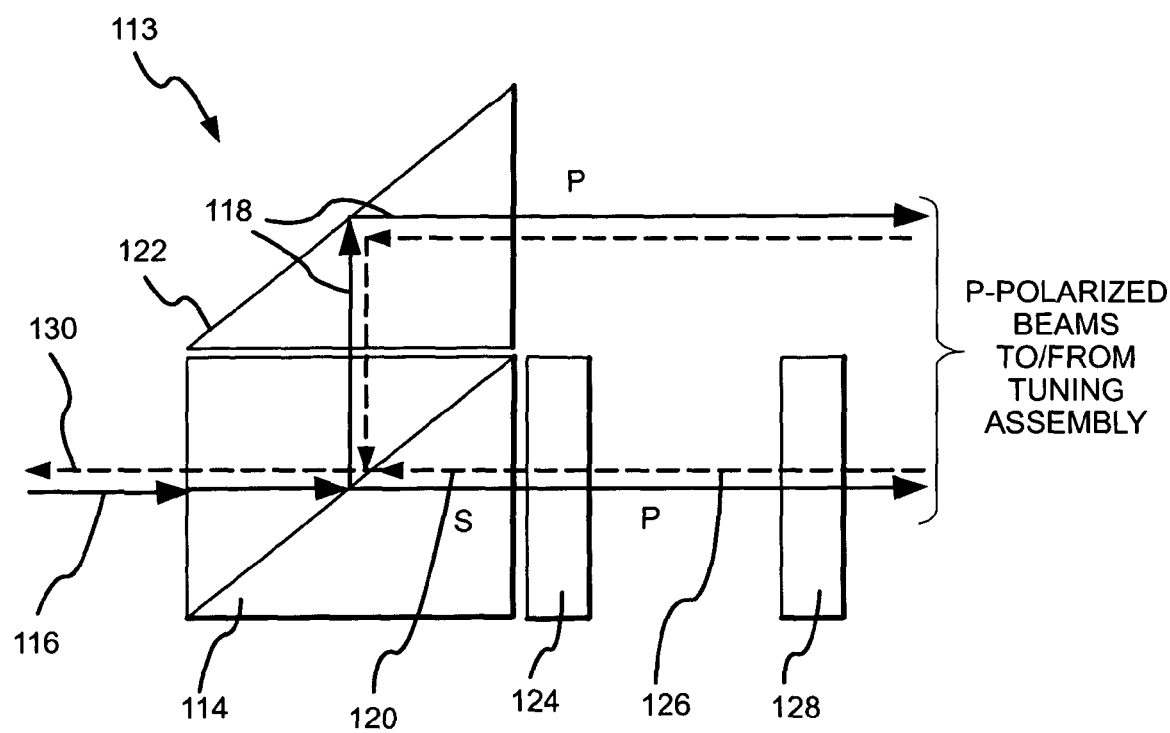
FIG. 6 is a block diagram of a polarization recovery element which may be utilized in the tunable optical filter of FIG. 1.

With reference to FIG. 6, one embodiment of a common path polarization recovery element 113 may include a first polarization beam splitting element 114 (hereafter, the "first polarization element") which receives an beam of light 116 via the input path 42 (as shown in FIG. 1). Desirably, the input path 42 provides collimated light by passing such input light beams first through a collimating optical element such as element 56. Commonly, the beam 116 is arbitrarily polarized, which, upon being received by the first polarization element 114 is split into a first p-polarized input beam 118 and an s-polarized input beam 120, wherein p-polarization refers to light that has been polarized into a plane that is parallel to the plane in which a given light wave oscillates and s-polarization is in a plane that is perpendicular to the plane of oscillation. In particular, the first polarization element 114 may be formed by a multi-layer dielectric coating via which the s-polarized beam 120 is transmitted through the element 114 and the p-polarized beam 118 is reflected at a 90° angle out of the element 114 towards a highly reflecting cube reflector 122 which reflects the p-polarized beam 118 at a 90° angle towards the mirror 44 (not shown in FIG. 6).

As further shown in FIG. 6, the s-polarized beam 120 is suitably propogated to a polarization element 124, which rotates the polarization of the s-polarized input beam 120 into a second p-polarized input beam 126. In particular, the polarizing element 124 may include a half-wave plate ($\lambda/2$) that is oriented at 45° relative to the s-polarization direction is so that upon receiving the s-polarized beam 120, the polarization element 124 rotates the polarization of the beam by 90°, thereby converting the s-polarized beam 120 into a second p-polarized beam 126.

Additionally, since the path length taken by the first p-polarized beam 118 is longer than the path length taken by the second p-polarized beam 126 (wherein both paths are measured through the first polarization element 114), a path length compensator 128 (e.g., a length of material with a highly refractive index) can be added to the s-polarized/second p-polarized path (i.e., 120–126) so that the first and second p-polarized beams 118 and 126 arrive at the mirror 45 at substantially the same time, thereby minimizing polarization-mode dispersion in the device (as discussed in greater detail below).

Additionally, it is to be appreciated that in a common path polarization recovery element 44, the input beams (i.e., the first and second polarized beams 118 and 126) are propogated upon the same pathway as are any returned diffracted beams. As shown in FIG. 6 by the dashed arrows (which are shown above/below the corresponding beams for purposes of illustration only), once the first and second p-polarized beams are propogated to the mirror 45 they are then returned to the polarization element 44). Once such diffracted beams reach the polarization element 44, the beams are suitably delayed, rotated, and combined in order to generate a returned output beam 130 whose polarization state is the same as that of the beam 116. As is discussed above, this returned output beam 130 is then provided on the output beam path 58.

The polarization recovery element can also be made using other types of polarizers, especially those based on double refraction in birefringent crystals. An example of such a known device is disclosed in U.S. Pat. No. 5,886,785, the entire contents of which are incorporated herein by this reference.

Figure 7:
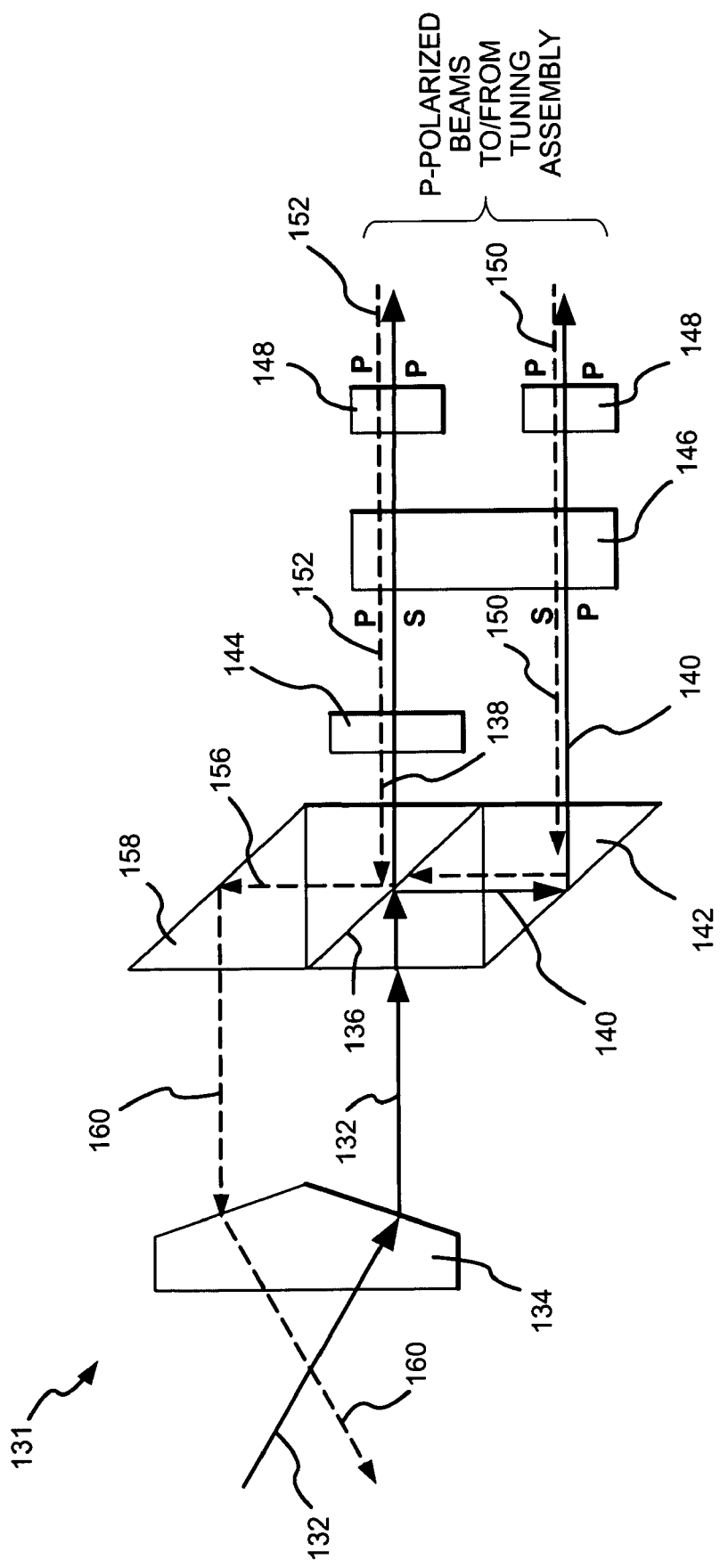
FIG. 7 is a block diagram of another embodiment of a polarization recovery element which may be utilized in the tunable optical filter of FIG. 1

Another embodiment of a combined polarization recovery element 131 in which separate input and output beams may be generated is shown in FIG. 7. In this embodiment, a randomly polarized input beam 132 is steered, by a steering element 134 (e.g., a beam steering prism), to a polarization beam splitter 136. Please note, that for purposes of illustration, in FIG. 7, the input beam is represented by a solid line, while the output beam is represented by a dashed line. Such input and output beams are propogated over a common path, such as the first path 48, to/from the mirror 45 and from/to the polarization beam splitter 136. As discussed above with reference to other embodiments, the polarization beam splitter 136 splits the input beam 132 into a transmitted s-polarized input beam 138 and a downward reflected first p-polarized input beam 140. The p-polarized input beam 148 propagates to a reflector 142 (for example, a right angle prism or alternatively a high reflectivity beam directing mirror) which reflects the p-polarized input beam 140 along a path that is parallel to the s-polarized input beam 138.

A path length compensator 144 is included along the path of the s-polarized input beam 138, so that the s and p polarized input beams (138 and 140) travel equivalent optical path lengths. The two input beams 138 and 140 propagate through a Faraday rotator 146 which rotates their respective polarizations by 45° in a common direction. The half-wave plates 148 are advantageously oriented such that both input beams 140 and 138 are p-polarized as they travel towards the mirror 44, for example, on the first path 48.

On the return path from the tuning assembly, the first and second p-polarized output beams 150 and 152, respectively, travel along the input beam paths and pass through the half-wave plates 148 and the Faraday rotator 146, as shown by the dashed lines in FIG. 7. The light beams propagating from the Faraday rotator 146 to the polarization beam splitter 136 and reflector 142 have polarization states that are orthogonal to the input light beams 138 and 140 counter propagating along the same paths. The s-polarized output beam 150 is reflected by first reflector 142 and passes through the polarization beam splitter 176 without deflection. The p-polarized output beam 152 is combined with the s-polarized output beam 150 by the polarization beam splitter 136 to form the combined output beam 156. A second reflector 158 (for example, a right angle prism or alternatively a high reflectivity mirror) reflects the combined output beam 136 through the beam steering element 134 and then to an output beam path 58.

Similarly, in other embodiments, it may be desirable to use separate coupling lenses for the input beam 132 and output beam 160. Two lens embodiments may be used, for example, to provide an increased working distance between the input lens and the tuning assembly or to permit a spatial filter and/or slit to be inserted in the output beam path. This approach is also useful for a tunable receiver, where a spatial filter and a photodiode are used in place of an output fiber. For example, by rotating reflector 158 (in FIG. 7) by 180°, a linear two-lens embodiment may be provided wherein the input and output lenses are located on opposite ends of the device. Similarly, a beam directing mirror or other reflective element may be utilized to direct an output beam in any direction. As such, it is to be appreciated that the various embodiments of the diffractive tunable filter of the present invention may be configured to direct output beams in practically any direction and/or to any suitable device or component.

Since the propagation speed of light through typical fiber and optical components is polarization dependent, for any optical component, the time averaged differential time delay between two orthogonal states of polarization is termed the differential group delay. The larger the differential group delay the larger the polarization mode dispersion. The polarization mode dispersion impacts a telecommunication system by delaying the transmission of different polarization components of an optical pulse. Discriminating between optical pulses at the detector becomes increasingly difficult as the polarization mode dispersion increases. Thus, minimization of polarization mode dispersion across the wavelength passband is an objective of all fiber and optical component design. Typical polarization mode dispersion for optical components in the same category as a tunable filter or tunable receiver is commonly <1 ps, and preferably <0.2 ps over the wavelength passband.

The polarization recovery element or modules depicted and described above with reference to FIGS. 6 and 7 prevent the occurrence of an unacceptable level of polarization mode dispersion by utilizing the compensator 128 and 144, which minimizes any path length differences which would otherwise arise between the two p-polarized beams incident on the mirror 44, for example, in FIG. 7 input beams 138 and 140. The amount of polarization mode dispersion depends on the thickness and refractive index of the optical components utilized. For example, in the embodiments shown in FIGS. 6 and 7, the s-polarized beams (120 and 138, respectively) that are transmitted by the beam splitters (114 and 136) travel approximately the same distance as the corresponding p-polarized beams (118 and 140) because of the addition of the compensators 128 and 144. Thus, the embodiments shown in FIGS. 6 and 7 minimize polarization mode dispersion by substantially compensating for any differences in delay between the different optical paths. Such delays occur because light travels increasingly slower through media with increasing refractive index.

A simple embodiment of a polarization mode dispersion compensator is an optically transparent plate. It is highly preferable that the refractive index of the polarization mode dispersion compensator plate material does not substantially change over the wavelength range of interest because changes in refractive index with wavelength reintroduces polarization mode dispersion. There are many choices for the plate material. For radiation in the telecommunication bands, silicon is a good choice because it has minimal dispersion and a high refractive index. Optimal thickness of the polarization mode dispersion compensator plate is determined from knowledge of the total tunable filter optical path difference and refractive index of the plate. In the polarization recovery element shown in FIG. 7, for example, the polarization mode dispersion may be reduced from 10 ps to <0.2 ps using a single simple silicon compensator plate with a mechanical thickness of about 0.57 mm.

Similar application of polarization mode dispersion compensation may be easily implemented in any polarization recovery element embodiments disclosed herein. Other polarization mode dispersion compensator embodiments may also be suitable for various embodiments of the present invention. These other compensator embodiments include, but are not limited to, prisms, plates or blocks. The use of several transparent optical plates in the polarization mode dispersion compensator could enable a minimal change in the value of polarization mode dispersion compensation across the wavelength range of interest. For example, two plates could be used where the dispersion of the two plates have different signs. The plates need not have the same mechanical thickness.

As discussed throughout the above description, the tunable filter 40 provides certain advantageous features and functions. The first of these advantageous features is the capability of a diffractive tunable filter to tune across large wavelength ranges such as the full C- and/or L-bands. While tuning across such wide wavelength ranges, the tunable filter 40 also supports simply adjustable transmission spectral bandwidths. Such adjustments being possible via the use of spatial slit filters, beam expanders and/or other components. Similarly, the tunable filter 40 supports simple adjustments to a transmissions spectral shape. For example, spectral shapes ranging from Gaussian to flat-top may be supported. Other advantages associated with various embodiments of the present invention include: small variations in the transmission spectral bandwidth over the wavelength tuning range; high adjacent channel isolation and high out-of-band isolation; low insertion loss; low polarization dependent loss; low chromatic dispersion and low polarization mode dispersion; fast wavelength tuning with micro-electromechanical rotary actuators; accurate center wavelength control with built-in wavelength reference and servos; center wavelength tracking to the incoming signal; compatible with tunable receiver separately or co-packaged, low-loss exit slit and receiver photodiode; environmentally robust, small form factor module; and the potential for volume manufacturing at low cost. Thus, it is to be appreciated that the tunable filter 40 offers significant features and functional advantages.

While the preferred embodiment of the filter 40 has been described with reference to certain devices and components and specifically to an embodiment in which a photodetector 68 may be utilized in conjunction with a slit 64 or other adjustable spatial filter assembly 60, it is to be appreciated that the filter may also be configured to not utilize such devices and/or components. For example, an output fiber may be utilized in lieu of the photodetector 68. Thus, it is to be appreciated that when a returned beam reaches the polarization recovery element 44, the filter 40 may variously distribute such returned beam for use at an output destination. Examples of such an output destination may include, but are not limited to, a receiver such as a photodiode receiver, an output fiber or any other optical device which may be directly or indirectly connected to the filter 40. In particular and as shown in FIG. 1 by the phantom lines, the input fiber 72 may be utilized as a common input/output beam path on which the input beam and the output or diffracted beam are transported to/from the filter 40, in general, and to/from the collimating optical element 56, in particular. Further, such an input/output fiber may be suitably connected to an optical circulator 168, the use and configuration of which are well known in the art. The optical circulator 168 desirably receives the input light beams from a second input fiber 170. Such input light beams then being propagated via the optical circulator 168 and the input fiber 72 to the collimating optical element 56 for further tuning by the filter 40 in accordance with the above descriptions. Output or diffracted beams are propogated by the polarization recovery element 44 to the collimating optical element 56 onto the input/output fiber 72 and then directed onto a separate output fiber 172 by the optical circulator 168. As such, it is to be appreciated that the filter of the present invention may output returned beams to additional filter assemblies, photodetectors (for use as a tunable receiver) and/or into separate output beam paths.

Figure 8:
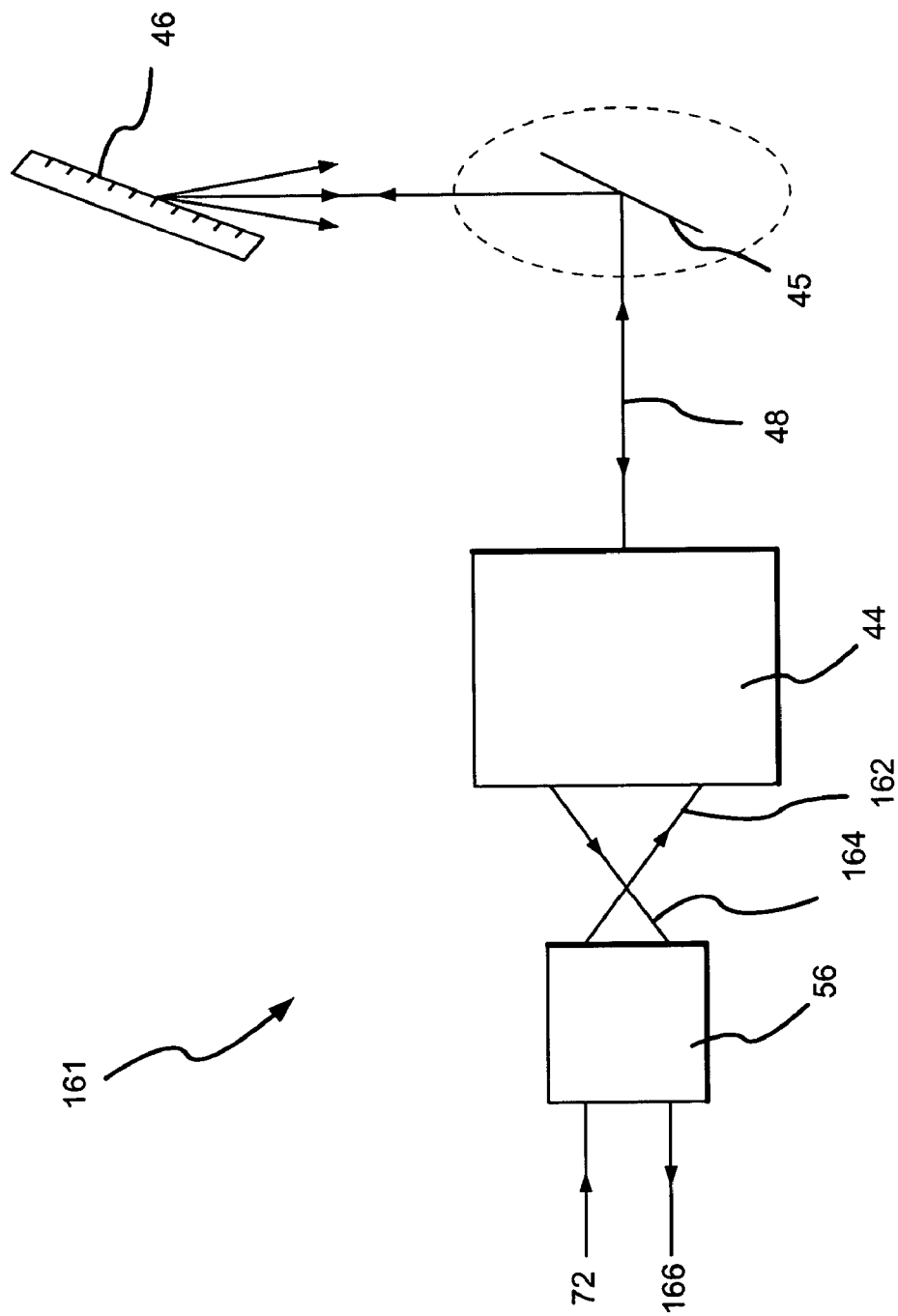
FIG. 8 is a block diagram of a further embodiment of a tunable filter of the present invention.

With respect to FIG. 8, the tunable filter 161 may be provided which includes a polarization recovery element which also provides the functions of an optical circulator. In particular, for this embodiment, the collimating optical element 56 includes an optical element that steers input beam 162 and output beams 164 onto separate paths, while the beams are propogated from/to a polarization recovery element 44 and to/from the mirror 45 are propogated along a common first path 48. As such, this embodiment provides for separation between input beams 162 and output beams 164 between the collimating optical element 56 and the polarization recovery element 44. Further, in this embodiment both the input fiber 72 and an output fiber 166 are connected to the collimating optical element. In general, FIG. 8 provides another embodiment of the filter 40 wherein the output beam path 58 filter assembly 60 and photodetector 68, as well as other related components, are not utilized.

Further, it is to be appreciated that various other embodiments of the filter 40 of the present invention may include all or less than all of the elements described above. For example, a second embodiment of the present invention may utilize only a collimating optical element 56, a polarization recovery element 44, a mirror 45 and a grating 46 to filter and tune a beam of light to a desired wavelength. In yet another embodiment, the filter may or may not include the beam expanders 74 and 76, focusing lens 62 or filter assembly 60, slit 64, photodetector 68, power monitor detector 98, wavelength control unit 92 and associated control devices. As such, the various elements set forth hereinabove, as well as other elements commonly known in the art, may be combined in various and numerous embodiments to provide the diffractive tunable filter of the present invention. Any and all such embodiments are considered to be within the scope of the present invention.

Additionally, various other embodiments of the present invention may utilize polarization recovery elements that include, for example, two port, single collimating lens designs. Such two port designs, in addition to those set forth above with respect to FIGS. 7 and 8, may utilize first and second bi-refringent crystals, first and second faraday rotators, wedges, and half-wave plates to separate input and output beams without using an optical circulator. Such an embodiment is further described in U.S. provisional patent application Ser. No. 60/402,127 filed Aug. 7, 2002, again, the entire contents of which are incorporated herein by reference.

Further, the tunable filter of the present invention may be configured to include multiple filter assemblies. Such embodiments may include using two or more slit or spatial filters (with associated focusing lenses) to further tune an output beam to a desired wavelength. Again, this and other alternative embodiments of the present invention are described in the above referenced U.S. provisional patent applications. As such, it is to be appreciated that the present invention may utilize numerous and various combinations of components to provide a diffractive tunable filter.

Although many of the embodiments of the present invention shown and described herein utilize only a single polarization recovery element, it should also be appreciated that two or more polarization recovery element can be used in alternative embodiments of the present invention. For example, a first polarization recovery element can be utilized to receive an input beam of light and condition such input beam of light into two or more p-polarized beams of light, for tuning by the tuning assembly. Additionally, a second polarization recovery element may be utilized to combine filtered p-polarized beams of light into a combined output beam of light. Other embodiments of the present invention may also be implemented as various embodiments of a tunable optical receiver.

The invention claimed is:

1. A tunable optical device for use with an input beam of light comprising a polarization recovery element adapted for receiving the input beam of light and outputting first and second spatially offset beams of polarized light, a dispersive optical element and a movable mirror for directing the first and second beams of polarized light onto the dispersive optical element and receiving a portion of the first and second beams of polarized light returned from the dispersive optical element.

2. The device of claim 1 further comprising an actuator coupled to the mirror for rotating the mirror about an axis of rotation.

3. The device of claim 2 further comprising a position detector apparatus coupled to the actuator for monitoring the position of the mirror.

4. The device of claim 1 further comprising an optical path compensator for receiving the first spatially offset beam of polarized light.

5. The device of claim 1 wherein the polarization recovery element includes means for converting the input beam of light into first and second beams of polarized light having planes of polarization that are rotated relative to each other.

6. The device of claim 5 wherein the planes of polarization of the first and second beams of polarized light are orthogonal to each other.

7. The device of claim 1 further comprising a collimating optical element for collimating the input beam before the input beam of light is received by the polarization recovery element.

8. The device of claim 1 further comprising an input fiber for directing the input beam of light.

9. The device of claim 1 wherein the first and second returned beams of light are directed by the mirror back through the polarization recovery element to produce an output beam of light.

10. The device of claim 1 wherein the portion of the first and second beams of polarized light returned from the dispersive optical element are combined by the polarization recovery element to produce an output beam of light.

11. The device of claim 10 further comprising an output collimating optical element for collimating the output beam of light.

12. The device of claim 10 further comprising an output fiber for receiving the output beam of light.

13. The device of claim 10 further comprising an optical detector for receiving the output beam of light and providing electrical signals based on characteristics of the output beam of light.

14. The device of claim 10 further comprising a collimating optical element for collimating the input beam of light and focusing the output beam of light.

15. The device of claim 10 further comprising a spatial filter for receiving the output beam of light to filter the output beam of light and produce at least one predetermined wavelength.

16. A tunable optical device for use with a received beam of light comprising a dispersive optical element and a movable mirror adapted for directing the received beam of light onto the dispersive optical element and receiving a portion of a beam of light returned by the dispersive optical element.

17. The device of claim 16 further comprising an actuator coupled to the mirror for rotating the mirror about an axis of rotation.

18. The device of claim 17 wherein the actuator is a micro-electromechanical actuator.

19. The device of claim 16 further comprising a position detector apparatus coupled to the actuator for monitoring the position of the mirror.

20. The device of claim 19 wherein the position detector apparatus includes a reference source for directing a reference beam onto the mirror and a detector for receiving the reference beam reflected by the mirror to monitor the position of the mirror.

21. The device of claim 20 wherein the reference source is a laser source.

22. The device of claim 19 further comprising a wavelength control unit coupled to the position detector apparatus for generating at least one output signal and a control unit coupled to the actuator and the wavelength control unit for receiving at least one output signal and providing a control signal to the actuator to control the rotation of the mirror.

23. The device of claim 22 further comprising an output power control apparatus coupled to the wavelength control unit for monitoring the power of the returned beam of light and providing at least one signal indicative of such power to the wavelength control unit.

24. The device of claim 23 wherein the position detector apparatus includes a closed loop servo control system.

25. The device of claim 16 further comprising a bandwidth adjuster for directing the received beam of light onto the mirror.

26. The device of claim 25 further comprising an additional bandwidth adjuster disposed between the mirror and the diffractive optical element.

27. The device of claim 26 wherein each of the first-named bandwidth adjuster and the additional bandwidth adjuster is a beam expander.

28. An optical apparatus for use with an input beam of light comprising
a polarization recovery element adapted for receiving the input beam of light and outputting first and second beams of light with the same polarization state,
a mirror for receiving the first and second beams of light and directing the first and second beams of light as first and second reflected beams of light to the diffractive optical element and directing first and second returned beams of light to the polarization recovery element,
an actuator coupled to the mirror for rotating the mirror,
a diffractive optical element for receiving the first and second reflected beams of light and producing the first and second returned beams of light, wherein the first and second returned beams of light have the same polarization state, and the polarization recovery element receiving the first and second returned beams of light and outputting a single output beam of light.

29. The apparatus of claim 28 further comprising an input fiber.

30. The apparatus of claim 29 further comprising an input collimating optical element disposed to receive the input beam of light from the input fiber.

31. The apparatus of claim 28 further comprising an output focusing optical element disposed to receive the output beam of light from the polarization recovery element.

32. The apparatus of claim 31 further comprising an output fiber disposed to receive light from the output collimating optical element.

33. The apparatus of claim 28 further comprising bandwidth adjusting means adapted for receiving the first and second reflected beams of light from the mirror, wherein the first and second reflected beams of light each have a given diameter; expanding the diameter of the first and second reflected beams of light and directing the expanded first and second reflected beams of light to the diffractive optical element.

34. The apparatus of claim 28 further comprising a mirror position sensing means.

35. The apparatus of claim 28 wherein the polarization recovery element has minimal polarization mode dispersion.

36. The apparatus of claim 28 further comprising a detector for receiving the output beam of light.

37. An optical apparatus for use with an arbitrarily polarized input beam of light comprising a polarizing beam splitter adapted for receiving and splitting the arbitrarily polarized input beam into first and second beams of polarized light, a Faraday rotator, a reflector for directing the first beam of polarized light to the Faraday rotator, a path length compensator disposed between the beam splitter and the Faraday rotator for delaying travel of the second beam of light to the Faraday rotator, the Faraday rotator aligning the first and second beams of polarized light in parallel planes to provide first and second aligned beams of polarized light and first and second half-wave plates for respectively receiving the first and second aligned beams of polarized light.

38. The apparatus of claim 37 wherein the reflector is a prism.

39. The apparatus of claim 37 further comprising a diffractive optical element and a movable mirror for directing the first and second aligned beams of polarized light onto the diffractive optical element.

40. The apparatus of claim 37 further comprising an additional prism for directing the randomly polarized input beam of light to the polarizing beam splitter.

41. An apparatus for use in a telecommunications system to shape the bandpass characteristics of a returned beam of light comprising a focusing element for receiving the returned beam of light and providing a second beam of light, a spatial filter for receiving the second beam of light and providing an output beam of light having a predetermined spectral profile and a detector for directly receiving the output beam of light, from the spatial filter without passing through the focusing element, and providing an electrical signal indicative of characteristics of the output beam of light.

42. The apparatus of claim 41 wherein the spatial filter is a slit.

43. The apparatus of claim 41 wherein the detector is a photodiode.

44. The apparatus of claim 41 wherein the focusing element is a lens.

45. The apparatus of claim 41 further comprising a diffractive tunable filter adapted to direct the returned beam of light to the focusing element.

46. The apparatus of claim 45 further comprising a polarization recovery element disposed between the diffractive tunable filter and the focusing lens.

* * * * *